(12) United States Patent
Ota et al.

(10) Patent No.: US 9,604,435 B2
(45) Date of Patent: Mar. 28, 2017

(54) MULTILAYER FILM AND METHOD FOR PRODUCING SAME

(71) Applicant: TORAY INDUSTRIES, INC., Tokyo (JP)

(72) Inventors: Kazuyoshi Ota, Otsu (JP); Yu Abe, Otsu (JP); Yasushi Takada, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 235 days.

(21) Appl. No.: 14/389,144

(22) PCT Filed: Feb. 7, 2013

(86) PCT No.: PCT/JP2013/052874
§ 371 (c)(1),
(2) Date: Sep. 29, 2014

(87) PCT Pub. No.: WO2013/145875
PCT Pub. Date: Oct. 3, 2013

(65) Prior Publication Data
US 2015/0072140 A1   Mar. 12, 2015

(30) Foreign Application Priority Data

Mar. 30, 2012   (JP) ................................. 2012-079363

(51) Int. Cl.
| | | |
|---|---|---|
| *B32B 27/16* | (2006.01) | |
| *B32B 27/26* | (2006.01) | |
| *B32B 27/36* | (2006.01) | |
| *B32B 27/08* | (2006.01) | |
| *B32B 27/30* | (2006.01) | |
| *B32B 38/00* | (2006.01) | |
| *B32B 37/18* | (2006.01) | |
| *B32B 37/24* | (2006.01) | |

(52) U.S. Cl.
CPC .............. *B32B 27/16* (2013.01); *B32B 27/08* (2013.01); *B32B 27/26* (2013.01); *B32B 27/308* (2013.01); *B32B 27/36* (2013.01); *B32B 38/0012* (2013.01); *B32B 37/182* (2013.01); *B32B 38/0008* (2013.01); *B32B 2037/243* (2013.01); *B32B 2038/0028* (2013.01); *B32B 2250/02* (2013.01); *B32B 2250/24* (2013.01); *B32B 2255/10* (2013.01); *B32B 2307/4026* (2013.01); *B32B 2307/412* (2013.01); *B32B 2307/516* (2013.01); *B32B 2307/518* (2013.01); *B32B 2307/536* (2013.01); *B32B 2307/584* (2013.01); *B32B 2307/732* (2013.01); *B32B 2309/02* (2013.01); *B32B 2367/00* (2013.01); *B32B 2457/20* (2013.01); *B32B 2457/208* (2013.01); *Y10T 428/269* (2015.01)

(58) Field of Classification Search
CPC ....... B32B 27/16; B32B 27/08; B32B 27/308; B32B 27/36; B32B 27/26; B32B 37/182; B32B 38/0012; B32B 38/0008; B32B 2367/00; B32B 2309/02; B32B 2307/516; B32B 2307/412; B32B 2307/243; B32B 2307/4026; B32B 2307/518; B32B 2307/732; B32B 2307/584; B32B 2255/10; B32B 2457/20; B32B 2457/208; B32B 2038/0028; B32B 2250/02; B32B 2250/24; Y10T 428/269
See application file for complete search history.

(56) References Cited

U.S. PATENT DOCUMENTS

2010/0255293 A1   10/2010   Toshiyuki

FOREIGN PATENT DOCUMENTS

| JP | 55-78068 A | | 6/1980 |
|---|---|---|---|
| JP | 9-226079 A | | 9/1997 |
| JP | 09226079 | * | 9/1997 |
| JP | 2001-26749 A | | 1/2001 |
| WO | WO 2009/057799 A1 | | 5/2009 |

OTHER PUBLICATIONS

International Search Report, mailed Apr. 16, 2013, issued in PCT/JP2013/052874.

* cited by examiner

*Primary Examiner* — Robert Jones, Jr.
(74) *Attorney, Agent, or Firm* — Birch, Stewart, Kolasch & Birch, LLP

(57) ABSTRACT

Provided is a multilayer film, in which a resin layer obtained using a resin (α) is provided on at least one surface of a polyester film, and which satisfies the conditions (I)-(IV) described below. (I) The resin layer has a thickness of 80-500 nm. (II) The resin layer has a pencil hardness of F or higher. (III) The multilayer film has a haze of 3.0% or less. (IV) The resin (α) is a resin that is obtained by heating a resin composition, which contains a resin (A) that has a hydroxyl group and an acryloyl group and a melamine compound (B) that has a methylol group, at 150° C. or higher. This multilayer film has a transparent resin layer that has a predominantly thin thickness of 500 nm or less, while having high hardness and excellent oligomer precipitation inhibiting properties.

20 Claims, No Drawings

MULTILAYER FILM AND METHOD FOR PRODUCING SAME

TECHNICAL FIELD

The present invention relates to a thermoplastic resin film, in particular, a multilayer film prepared by laminating a resin layer on a polyester film. More particularly, the present invention relates to a multilayer film having a resin layer excellent in suppressing scratches on the film surface generated during the film-forming or transporting process of a polyester film and inhibiting oligomers from precipitating from a polyester film in the processing process accompanied with a heating treatment.

BACKGROUND ART

Among the thermoplastic resin films, a biaxially stretched polyester film has been widely used as a substrate film in many applications such as magnetic recording materials and packaging materials since the film has properties excellent in mechanical properties, electrical properties, dimensional stability, transparency, chemical resistance and the like. Particularly in recent years, there has been an increase in demand for various films for optics including antireflection materials for a flat panel display and display materials associated with a touch panel. In such applications, coating processing for imparting various functions and processing for allowing the film and an electrode material or an optical film to be bonded together are frequently performed.

However, with regard to the polyester film, for example, in the transporting process, scratches are sometimes generated on the polyester film surface due to abrasion between the film and a transporting roll. Moreover, due to a heat treatment performed in the coating processing process, a polyester film as a final product has been sometimes too poor for practical use since oligomers are allowed to precipitate from the polyester film, whitening of the polyester film occurs and the surface thereof is contaminated.

On that account, various investigations have hitherto been conducted for the purpose of enhancing the hardness of a polyester film and inhibiting oligomers from precipitating. For example, an investigation for the purpose of laminating an ultraviolet-curing type acrylic resin coated film on the surface of a polyester film has been conducted (Patent Document 1). Moreover, a method of providing a coated film using a thermosetting acrylic resin and a crosslinking agent by an in-line coating method in which coating is performed within a process for the production of a thermoplastic resin film (Patent Document 2) has been studied. Moreover, there have been proposed a method of achieving the enhancement of the coated film hardness by adding a thermal initiator to an acrylic resin coated film (Patent Document 3) and a method of preventing damage by providing a coated film prepared with a binder resin and specific organic particles by off-line processing and imparting easy slipping properties (Patent Document 4).

PRIOR ART DOCUMENTS

Patent Documents

Patent Document 1: Japanese Patent Laid-open Publication No. 2004-354828
Patent Document 2: Japanese Patent Laid-open Publication No. 2005-89622
Patent Document 3: Japanese Unexamined Patent Application Publication (Translation of PCT Application) No. 2008-524402
Patent Document 4: Japanese Patent Laid-open Publication No. 2007-86730

SUMMARY OF THE INVENTION

Problems to be Solved by the Invention

However, in a method of providing an ultraviolet-curing type acrylic resin as a resin layer on the polyester film surface as described in Patent Document 1, there are the following drawbacks. In order to prepare a multilayer film which is high in hardness and has properties for inhibiting precipitation of oligomers (oligomer precipitation inhibiting properties), a resin layer with a thickness of several μm is required. Moreover, since the influence of radical curing obstruction by oxygen in the air is extremely large, the method has a drawback that, even at the time of forming a thin film resin layer with a thickness of 1 μm or less, the resin layer is not hardened. Moreover, as described in Patent Documents 2 and 3, in a general method of providing a resin layer using a thermosetting acrylic resin and a crosslinking agent, although the formation of a resin layer with a thickness of 1 μm or less is possible, the resin layer is inferior to that of Patent Document 1 in hardness, and moreover, the oligomer precipitation inhibiting properties are lowered. As described in Patent Document 4, in a method of allowing organic particles to be contained in a resin layer and allowing the resin layer to be provided, a resin layer with a thickness of several μm is required as in the case of Patent Document 1. Moreover, since organic particles are used and the haze becomes an extremely high value of 85% or more, the resin layer is not applicable to various films for optics including antireflection materials for a flat panel display and display materials associated with a touch panel.

Accordingly, the present invention is aimed at eliminating the above-mentioned problems and providing a multilayer film having a resin layer which has a predominantly thin thickness of 500 nm or less, is high in hardness and is excellent in properties for inhibiting precipitation of oligomers.

Solutions to the Problems

The present invention comprises the following constitution. That is to say, the present invention is directed to a multilayer film comprising a resin layer which is prepared with a resin (α) and provided on at least one surface of a polyester film, and satisfying the following conditions (I) to (IV):

(I) the resin layer has a thickness of 80 to 500 nm;
(II) the resin layer has a pencil hardness of "F" or higher;
(III) the multilayer film has a haze value of 3.0% or less; and
(IV) the resin (α) is a resin obtained by heating a resin composition containing a resin (A) having a hydroxyl group and an acryloyl group and a melamine compound (B) to 150° C. or higher.

Effects of the Invention

The multilayer film according to the present invention is satisfactory in transparency and exhibits effects of preventing the occurrence of scratches in the transporting process and the processing process and inhibiting the precipitation of oligomers from a polyester film as a substrate film, which precipitation is problematic at the time of a heating treatment.

EMBODIMENTS OF THE INVENTION

Hereinafter, the multilayer film according to the present invention will be described in detail.

The present invention is directed to a multilayer film prepared by laminating a resin layer on at least one surface of a polyester film as a substrate film.

(1) Resin Layer

With regard to the resin layer of the multilayer film according to the present invention, it is necessary to allow the resin layer thickness to be 80 nm or more and 500 nm or less. By allowing the resin layer thickness to be 80 nm or more, it is possible to allow the pencil hardness of the resin layer in the present invention to be "F" or higher and to impart oligomer precipitation inhibiting properties. By allowing the resin layer thickness to be 500 nm or less, the transparency and handling properties of the multilayer film become satisfactory.

Moreover, with regard to the multilayer film according to the present invention, as described above, it is necessary to allow the pencil hardness of the resin layer to be "F" or higher. By allowing the pencil hardness of the resin layer to be "F" or higher, it is possible to suppress the occurrence of scratches in the transporting process at the time of film-forming or processing.

Furthermore, with regard to the multilayer film according to the present invention, it is necessary to allow the haze value to be 3.0% or less. By allowing the haze value to be 3.0% or less, for example, the film can be suitably used for a film for optics such as a film for display in which transparency is required. For example, in the case where the multilayer film according to the present invention is used as a film for display, it is possible to suppress the white turbidity of a display and the deterioration in resolution can be suppressed.

Moreover, in the present invention, it is necessary to allow a resin layer prepared with a resin (α) to be provided on at least one surface of a polyester film. In this connection, the details of the resin (α) will be described later.

Moreover, with regard to a resin forming the resin layer in the multilayer film according to the present invention, it is preferred that the content obtained by totaling a resin (α), a resin (A) having a hydroxyl group and an acryloyl group and a melamine compound (B) having a methylol group be 70% by mass or more relative to the whole resin forming the resin layer. By allowing the total content of the resin (α), the resin (A) and the melamine compound (B) in a resin forming the resin layer to be 70% by mass or more, it is possible to prevent scratches and to inhibit the precipitation of oligomers.

The resin (α) is a resin obtained by heating a resin composition prepared with a resin (A) having a hydroxyl group and an acryloyl group and a melamine compound (B) having a methylol group to 150° C. or higher. When the resin composition prepared with a resin (A) and a melamine compound (B) is heated to 150° C. or higher, two different acryloyl groups of the resin (A) are crosslinked to form a crosslinked structure, a hydroxyl group of the resin (A) and a methylol group of the melamine compound (B) are crosslinked to form a crosslinked structure (a structure expressed by formula (1) described later), and two different methylol groups of the melamine compound (B) are crosslinked to form a crosslinked structure (a structure expressed by formula (2) described later). Since crosslinking reactions between two different acryloyl groups of the resin (A), a hydroxyl group of the resin (A) and a methylol group of the melamine compound (B), and two different methylol groups of the melamine compound (B) are high in reactivity, the resin (α) becomes a resin having many crosslinked structures. When the number of the hydroxyl groups or acryloyl groups of the resin (A) and the number of the methylol groups of the melamine compound (B) are increased, it is possible to obtain a resin (α) in which a more densely crosslinked structure is formed.

That is, in the present invention, it is preferred that the resin forming the resin layer have a crosslinked structure of two different acryloyl groups. Moreover, it is preferred that the resin forming the resin layer have a crosslinked structure (a chemical structure) of a hydroxyl group and a methylol group expressed by formula (1). Moreover, it is preferred that the resin forming the resin layer have a crosslinked structure of two different methylol groups expressed by formula (2).

[Chemical Formula 1]

Formula (1)

[Chemical Formula 2]

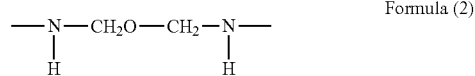

Formula (2)

As such, since the resin forming the resin layer or the resin (α) has a densely crosslinked structure, the hardness of the resin layer can be dramatically enhanced. In addition, a multilayer film which hardly suffers from scratches in the transporting process and the processing process, allows a small amount of oligomers to precipitate after heating, and is excellent in transparency can be attained. In particular, even when the multilayer film according to the present invention is subjected to a heating treatment for 1 hour at 150° C., the rate of change in haze remains within 0.3% or less. On that account, the multilayer film according to the present invention is suitably provided for applications where the film is heated and transparency is required. Specifically, the multilayer film according to the present invention is suitably provided for applications where a hard coat layer and a conductive layer such as indium tin oxide (hereinafter referred to as ITO) are provided on the film (for example, the application in a touch panel). This is because heat is applied at high temperatures to the multilayer film at the time of allowing a hard coat layer and a conductive layer such as ITO to be laminated, and high transparency is required even after these layers are laminated.

It is necessary to allow the multilayer film according to the present invention to have a resin layer prepared with a resin (α). Any production method is acceptable as long as a multilayer film which satisfies the conditions described above is prepared. A multilayer film having a resin layer prepared with a resin (α) can be produced by applying a resin composition prepared with a resin (A) having a hydroxyl group and an acryloyl group and a melamine compound (B) having a methylol group on at least one surface of a polyester film (a substrate film) and heating the resin composition to 150° C. or higher.

(2) Resin (α) and Crosslinked Structure

As described above, the resin (α) used in the present invention is a resin obtained by heating a resin composition prepared with a resin (A) having a hydroxyl group and an acryloyl group and a melamine compound (B) having a methylol group to 150° C. or higher. The resin (α) and the like will be described below in detail.

In the multilayer film according to the present invention, it is preferred that the resin (α) be a resin with a glass transition temperature of 50° C. or higher. By allowing the resin (α) to be a resin with a glass transition temperature of 50° C. or higher, the hardness of the resin layer is heightened, and the resin layer can be not only imparted with oligomer precipitation inhibiting properties and scratch suppressing properties but also imparted with an effect of suppressing the permeation of an organic solvent, the erosion of the resin and the like. Allowing the resin (α) to have a glass transition temperature of 50° C. or higher can be accomplished by, for example, heating a resin composition prepared with a resin (A) having a glass transition temperature of 50° C. or higher and a melamine compound (B) to 150° C. or higher to obtain a resin (α).

Moreover, in order to enhance the hardness of the resin layer, the oligomer precipitation inhibiting properties and the like, it is preferred that a resin forming the resin layer or a resin (α) have the following structure.

First, it is preferred that the resin (α) have a structure obtained by crosslinking two different acryloyl groups. That is, it is preferred that the resin forming the resin layer have a structure obtained by crosslinking two different acryloyl groups. The crosslinked structure can be formed by heating a resin (A) having an acryloyl group to 150° C. or higher.

Next, it is preferred that the resin (α) have a structure expressed by formula (1):

[Chemical Formula 3]

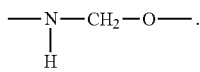

Formula (1)

The structure expressed by formula (1) is a structure obtained by crosslinking a hydroxyl group and a methylol group. That is, it is preferred that the resin forming the resin layer have a chemical structure of the formula (1) obtained by crosslinking a hydroxyl group and a methylol group. The crosslinked structure can be formed by heating a resin (A) having a hydroxyl group and a melamine compound (B) having a methylol group to 150° C. or higher. By allowing a resin forming the resin layer or a resin (α) to have a structure expressed by formula (1), it is possible to allow the resin layer to have a high hardness and oligomer precipitation inhibiting properties.

Furthermore, it is preferred that the resin (α) have a structure expressed by formula (2):

[Chemical Formula 4]

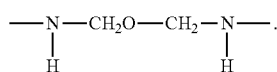

Formula (2)

The structure expressed by formula (2) is a structure obtained by crosslinking two different methylol groups. That is, it is preferred that the resin forming the resin layer have a chemical structure of the formula (2) obtained by crosslinking two different methylol groups. The crosslinked structure can be formed by heating a melamine compound (B) having a methylol group to 150° C. or higher. By allowing a resin forming the resin layer or a resin (α) to have a structure expressed by formula (2), it is possible to allow the resin layer to have a high hardness and oligomer precipitation inhibiting properties.

In addition, it is preferred that the resin (α) have a structure expressed by formula (3):

[Chemical Formula 5]

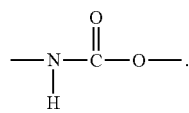

Formula (3)

The structure expressed by formula (3) is a urethane structure. That is, it is preferred that the resin forming the resin layer have a chemical structure of the formula (3). The structure can be introduced into a resin (α) by, for example, using a resin (A) having a urethane structure as well as a hydroxyl group and an acryloyl group. By allowing a resin forming the resin layer or a resin (α) to have a structure expressed by formula (3), it is possible to allow the resin layer to have a stretchability and an elasticity. Accordingly, although there is a case where a crack is generated or curling is generated in the resin layer at the time when a resin (α) is formed (at the time when a crosslinked structure of two different acryloyl groups and crosslinked structures expressed by formulas (1) and (2) are formed), by allowing a resin forming the resin layer or a resin (α) to have a structure of the formula (3), it is possible to suppress the occurrence of a crack and curling.

In the present invention, in the case of obtaining a resin (α) using a resin (A) and a melamine compound (B), with regard to the mass ratio between the resin (A) and the melamine compound (B) in a resin composition (a mixture of the resin (A) and the melamine compound (B)) for forming a resin layer, it is preferred that the mass of the melamine compound (B) be 30 parts by mass or more and 100 parts by mass or less when the mass of the resin (A) is defined as 100 parts by mass. It is more preferred that the mass of the melamine compound (B) be 30 parts by mass or more and 60 parts by mass or less. By allowing the mass of the melamine compound (B) to be 30 parts by mass or more, it is possible to allow the resin (α) to sufficiently have a structure of the formula (2). As a result thereof, it is possible not only to allow the resin layer to have a pencil hardness of "F" or higher but also to remarkably inhibit the precipitation of oligomers. Moreover, the adhesiveness between the resin layer and various inks, a hard coat agent or the like is enhanced, and furthermore, the flexibility, toughness and solvent resistance are also enhanced. On the other hand, by allowing the mass of the melamine compound (B) to be 100 parts by mass or less, it is possible to suppress the curing shrinkage which occurs at the time when the structure of the formula (2) is formed. As a result thereof, it is possible to suppress the occurrence of a crack in the resin layer and to allow the haze value of the multilayer film to be 3.0% or less.

(3) Resin (A) having Hydroxyl Group and Acryloyl Group

The resin (A) having a hydroxyl group and an acryloyl group used in the present invention is a resin having at least one or more hydroxyl groups and one or more acryloyl groups. In the present invention, the acryloyl group refers to a concept that includes a methacryloyl group.

In the present invention, with regard to the resin (A) having a hydroxyl group and an acryloyl group, any form of resin having them is acceptable as long as a resin (α) can be formed by heating the resin (A) to 150° C. or higher together with a melamine compound (B). For example, the resin (A) may be a resin composed of a polymer having a hydroxyl group and a polymer having an acryloyl group, and may be a resin composed of a polymer in which the hydroxyl group and the acryloyl group constitute the repeating unit. Of these, it is preferred that the resin (A) be a resin composed of a polymer obtained by using an acrylic acid ester compound and/or a methacrylic acid ester compound (a), an ethylene-based unsaturated compound (b) having a hydroxyl group, and a compound (c) having a chemical structure (a urethane structure) expressed by formula (3) and a multifunctional acryloyl group, and allowing these to undergo a polymerization. From the point of allowing a densely crosslinked structure to be formed, it is more preferred that the resin (A) be composed of a polymer prepared by subjecting a hydrocarbon chain formed from the (a) to graft polymerization randomly with the (b) and the (c). By heating a resin (A) prepared by polymerizing these monomers ((a), (b) and (c)) to 150° C. or higher together with a melamine compound (B), the resin (a) described above can be formed. Hereinafter, the compounds (a), (b) and (c) will be described.

Acrylic Acid Ester Compound and/or Methacrylic Acid Ester Compound (a):

The compound (a) is a monomer which forms a main skeleton of the resin (A). Specific examples of the compound (a) include an alkyl ester with 1 to 18 carbon atoms of an acrylic acid and/or a methacrylic acid, and the like such as methyl acrylate, ethyl acrylate, n-propyl acrylate, i-propyl acrylate, n-butyl acrylate, i-butyl acrylate, t-butyl acrylate, n-octyl acrylate, i-octyl acrylate, t-octyl acrylate, 2-ethylhexyl acrylate, methyl methacrylate, ethyl methacrylate, n-propyl methacrylate, i-propyl methacrylate, n-butyl methacrylate, i-butyl methacrylate, t-butyl methacrylate, n-octyl methacrylate, i-octyl methacrylate, t-octyl methacrylate and 2-ethylhexyl methacrylate; a cycloalkyl ester with 5 to 12 cyclo-carbon atoms such as cyclohexyl acrylate; an aralkyl ester with 7 to 12 carbon atoms such as benzyl acrylate, and the like.

In the case of preparing a resin (A) by using the compounds (a), (b) and (c) and allowing them to undergo a polymerization, it is preferred that the mass of the compound (a) be 55 parts by mass or more and 98 parts by mass or less when the total mass of the compounds (a) to (c) is defined as 100 parts by mass. By allowing the mass (the charge amount) of the compound (a) to lie within the above-mentioned numerical value range, the resin (A) can be efficiently prepared by the polymerization.

Ethylene-based Unsaturated Compound (b) having Hydroxyl Group:

It is necessary to allow the compound (b) to have a hydroxyl group. By using the compound (b) as a monomer, it is possible to allow the resin (A) to have a hydroxyl group.

As a specific example of the compound (b), an unsaturated compound containing one or more hydroxyl group in its molecule such as 2-hydroxyethyl acrylate, 2-hydroxypropyl acrylate, 3-hydroxypropyl acrylate, 2-hydroxybutyl acrylate, 3-hydroxybutyl acrylate, 4-hydroxybutyl acrylate, 6-hydroxyhexyl acrylate, 2-hydroxy ethyl allyl ether, 2-hydroxy propyl allyl ether, 2-hydroxy butyl allyl ether, allyl alcohol, 2-hydroxyethyl methacrylate, 2-hydroxypropyl methacrylate, 3-hydroxypropyl methacrylate, 2-hydroxybutyl methacrylate, 3-hydroxybutyl methacrylate, 4-hydroxybutyl methacrylate, 6-hydroxyhexyl methacrylate, 2-hydroxy ethyl methallyl ether, 2-hydroxy propyl methallyl ether or 2-hydroxy butyl methallyl ether is preferred.

Moreover, the compound (b) may have a carboxyl group.

In the case of preparing a resin (A) by using the compounds (a), (b) and (c) and allowing them to undergo a polymerization, it is preferred that the mass of the compound (b) be 1 part by mass or more and 30 parts by mass or less when the total mass of the compounds (a) to (c) is defined as 100 parts by mass. By allowing the mass (the charge amount) of the compound (b) to be 1 part by mass or more, it is possible to allow the resin (A) to have a sufficient amount of hydroxyl groups. Moreover, by allowing the mass of the compound (b) to be 30 parts by mass or less, the resin (A) can be efficiently prepared by the polymerization. When the mass of the compound (b) exceeds 30 parts by weight, at the time of preparing a coating liquid containing a resin composition by a method described below, there is a case where the compound (b) becomes difficult to be suitably used since a resin (A) to be water-dispersed or water-solubilized in an aqueous solvent (E) turns into a gel or flocculates.

Compound (c) having Chemical Structure (Urethane Structure) Expressed by Formula (3) and Acryloyl Group:

It is necessary to allow the compound (c) used in the present invention to have an acryloyl group. Moreover, when the acryloyl group which the compound (c) has is multifunctional, the group is preferred because a densely crosslinked structure can be formed in the resin (α). It is preferred that the number of acryloyl groups which the compound (c) has be 2 or more and 15 or less. In the present invention, the acryloyl group refers to a concept that includes a methacryloyl group. By using the compound (c) as a monomer, it is possible to allow the resin (A) to have an acryloyl group. Moreover, it is preferred that the compound (c) have a urethane structure in its molecule in addition to a multifunctional acryloyl group. By using the compound (c) as a monomer, it is possible to allow the resin (A) to have an acryloyl group and a urethane structure.

As the compound (c), specifically, a urethane acrylate compound synthesized and obtained by allowing a compound obtained by allowing a polyhydric alcohol and an isocyanate monomer and/or an organic polyisocyanate to undergo a reaction and an acrylate monomer having a hydroxyl group and/or a methacrylate monomer having a hydroxyl group to undergo a reaction under a solventless condition or in the presence of an organic solvent is preferred.

Examples of the polyhydric alcohol include acrylic polyols, polyester polyols, polycarbonate polyols, ethylene glycol, propylene glycol and the like. Examples of the isocyanate monomer include tolylene diisocyanate, diphenyl methane diisocyanate, xylylene diisocyanate, isophorone diisocyanate, hexamethylene diisocyanate and the like, and examples of the organic polyisocyanate include an adduct type polyisocyanate, an isocyanurate type polyisocyanate, and a biuret type polyisocyanate which are synthesized from isocyanate monomers, and the like. Examples of the acrylate monomer having a hydroxyl group include 2-hydroxyethyl acrylate, 2-hydroxy-3-phenoxypropyl acrylate, isocyanuric acid ethylene oxide-modified diacrylate, pentaerythritol tri- and tetra-acrylates, dipentaerythritol pentaacrylate, and the like. Examples of the methacrylate monomer having a hydroxyl group include 2-hydroxyethyl methacrylate, hydroxypropyl methacrylate, and the like. Moreover, a methylol group may be contained in the compound (c).

In the case of preparing a resin (A) by using the compounds (a), (b) and (c) and allowing them to undergo a polymerization, it is preferred that the mass of the compound (c) be 1 part by mass or more and 15 parts by mass or less when the total mass of the compounds (a) to (c) is defined as 100 parts by mass. By allowing the mass of the compound (c) to be 1 part by mass or more, it is possible to allow the resin (A) to have sufficient amounts of acryloyl groups and urethane structures.

On the other hand, when the mass of the compound (c) exceeds 15 parts by mass, it is not preferred because the following phenomenon may occur. That is, since the resin (A) has an excess amount of acryloyl groups when the mass of the compound (c) exceeds 15 parts by mass, great many crosslinked structures of two different acryloyl groups are formed when the resin (A) is heated to 150° C. or higher to obtain a resin ($\alpha$). As a result thereof, significant curing shrinkage is caused and a crack may be generated in the resin layer. Moreover, even when the resin (A) is heated to 150° C. or higher to obtain a resin ($\alpha$), the resin layer may be inferior in hardness since the hardness of the resin ($\alpha$) cannot be sufficiently enhanced.

(4) Production Method of Resin (A) having Hydroxyl Group and Acryloyl Group

Although the production method of a resin (A) used in the present invention is not particularly limited and a known technique can be applied thereto, it is preferred that the compounds (a), (b) and (c) be used as monomers. Furthermore, with regard to the production method of a resin (A), it is preferred that the resin (A) be produced by emulsion polymerization in an aqueous solvent (E) with the compounds (a), (b) and (c). By using the aqueous solvent (E), the preparation of a coating liquid which contains a resin composition and is prepared with the aqueous solvent (E) is facilitated. Moreover, in the case where a resin (A) is produced by emulsion polymerization, it is preferred because the resin (A) is excellent in mechanical dispersion stability.

As an emulsifying agent used in the present invention, either of an anionic emulsifying agent or of a nonionic emulsifying agent is not particularly limited, and the emulsifying agents may be used alone or in combination of two or more thereof.

Examples of the anionic emulsifying agent include higher fatty acid salts such as sodium oleate, alkylarylsulfonic acid salts such as sodium dodecylbenzenesulfonate, alkyl sulfate salts such as sodium lauryl sulfate, and the like. Moreover, examples of the nonionic emulsifying agent include polyoxyethylene alkyl ethers such as polyoxyethylene lauryl ether, polyoxyethylene octylphenyl ethers, and the like.

At the time of emulsion polymerization, a polymerization initiator including persulfates such as sodium persulfate, potassium persulfate and ammonium persulfate, organic peroxides such as t-butyl hydroperoxide, cumene hydroperoxide and p-menthane hydroperoxide, hydrogen peroxide, and the like is usually used. These polymerization initiators may be either used alone or in combination of plural kinds thereof.

Moreover, at the time of emulsion polymerization, a reducing agent can be used in combination with the polymerization initiator, as necessary. As such a reducing agent, for example, a reducing organic compound such as ascorbic acid, tartaric acid, citric acid, glucose and a formaldehyde sulfoxylate metal salt; a reducing inorganic compound such as sodium thiosulfate, sodium sulfite, sodium bisulfite, sodium metabisulfite and ammonium bisulfite, and the like can be used.

Furthermore, at the time of emulsion polymerization, a chain transfer agent can be used. Examples of such a chain transfer agent include n-dodecyl mercaptan, t-dodecyl mercaptan, n-butyl mercaptan, 2-ethylhexyl thioglycolate, 2-mercaptoethanol, trichlorobromomethane, and the like. The polymerization temperature suitably employed in the emulsion polymerization of a resin (A) in the present invention is about 30 to 100° C.

(5) Melamine Compound (B) having Methylol Group

It is necessary to allow the melamine compound (B) which can be used in the present invention to have one or more triazine rings and one or more methylol groups in one molecule. By using the melamine compound (B), it is possible to allow the resin ($\alpha$) to have a crosslinked structure of two different methylol groups expressed by formula (2).

As the melamine compound (B), specifically, a compound prepared by subjecting a methylol melamine derivative obtained by allowing a melamine and formaldehyde to undergo a condensation to a dehydration condensation reaction with a lower alcohol such as methyl alcohol, ethyl alcohol and isopropyl alcohol to perform etherification, and the like are preferred.

Examples of the methylolated melamine derivative include monomethylol melamine, dimethylol melamine, trimethylol melamine, tetramethylol melamine, pentamethylol melamine and hexamethylol melamine.

(6) Compound (C) having One or More Functional Groups Selected from the Group Consisting of a Methylol Group, an Amino Group, an Isocyanate Group, an Epoxy Group, an Alkoxysilane Group, an Oxazoline Group, a Carboxyl Group and a Carbodiimide Group:

In the present invention, it is possible to allow a compound (C) having one or more functional groups selected from the group consisting of a methylol group, an amino group, an isocyanate group, an epoxy group, an alkoxysilane group, an oxazoline group, a carboxyl group and a carbodiimide group to be contained in a resin forming the resin layer, in addition to the resin ($\alpha$), the resin (A) and the melamine compound (B). It is preferred that the mass of the compound (C) be 30% by mass or less when the whole resin forming the resin layer is defined as 100% by mass. By allowing the mass of the compound (C) to be 30% by mass or less, it is possible to enhance the characteristics such as adhesiveness to various inks, a hard coat agent or the like, moist heat resistant adhesiveness, flexibility and toughness while maintaining the excellent properties such as resin layer hardness, oligomer precipitation inhibiting properties and transparency resulting from the resin ($\alpha$).

With regard to the compound having a methylol group, specifically, it is preferred that one or two or more kinds of N-methylolacrylamide, N-methylolmethacrylamide and the like which are unsaturated carboxylic acid amides having a methylol group be used.

Examples of the compound having an amino group include aminoalkyl esters such as aminoethyl acrylate, dimethylaminoethyl acrylate, diethylaminoethyl acrylate, butylaminoethyl acrylate, aminoethyl methacrylate, dimethylaminoethyl methacrylate, diethylaminoethyl methacrylate and butylaminoethyl methacrylate; carboxylic acid aminoalkylamides such as aminoethyl acrylamide, dimethylaminomethyl acrylamide, methylaminopropyl acrylamide, aminoethyl methacrylamide, dimethylaminomethyl methacrylamide and methylaminopropyl methacrylamide, and the like.

The compound having an isocyanate group can be exemplified by an aromatic polyisocyanate compound such as 1,3- or 1,4-phenylene diisocyanate, 2,4- or 2,6-tolylene diisocyanate, 1,5-naphthylene diisocyanate, 4,4-diphenylmethane diisocyanate, 3,3-dimethyldiphenylmethane-4,4-diisocyanate and 1,3-xylylene diisocyanate; an aliphatic polyisocyanate compound such as 1,4-tetramethylene diisocyanate, 1,6-hexamethylene diisocyanate, 2,2,4-trimethyl-1,6-hexamethylene diisocyanate, 1,8-octamethylene diisocyanate and 1,10-decamethylene diisocyanate; a dimer or a trimer of these isocyanates; an adduct product between one of these isocyanates and a divalent or trivalent polyol such as ethylene glycol and trimethylolpropane, and the like.

Examples of the compound having an epoxy group include glycidyl acrylate, 3,4-epoxycyclohexylmethyl acrylate, glycidyl allyl ether, glycidyl vinyl ether, 3,4-epoxycyclohexyl vinyl ether, glycidyl methacrylate, 3,4-epoxycyclohexylmethyl methacrylate, glycidyl methallyl ether, and the like.

Examples of the compound having an alkoxysilane include vinyltrimethoxysilane, vinyltriethoxysilane, vinyltri(βmethoxyethoxy)silane, β-(3,4-epoxycyclohexyl)ethyltrimethoxysilane, γ-glycidoxypropyltrimethoxysilane, γ-glycidoxypropylmethyldiethoxysilane, γ-glycidoxypropyltriethoxysilane, γ-methacryloxypropyltrimethoxysilane, γ-methacryloxypropylmethyldimethoxysilane, γ-methacryloxypropyltriethoxysilane, γ-methacryloxypropylmethyldiethoxysilane, N-β(aminoethyl)γ-aminopropyltrimethoxysilane, N-β(aminoethyl)γ-aminopropylmethyldimethoxysilane, N-β(aminoethyl)γ-aminopropyltriethoxysilane, γ-aminopropyltrimethoxysilane, γ-aminopropyltriethoxysilane, and the like.

Although the compound having an oxazoline group is not particularly limited as long as the compound is one having at least one or more oxazoline groups or oxazine groups per one molecule, an addition polymerizable oxazoline group-containing monomer is preferred, and examples thereof include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline and 2-isopropenyl-5-ethyl-2-oxazoline.

Although the compound having a carboxyl group is not particularly limited as long as the compound is an unsaturated compound containing one or more carboxyl groups in its molecule, examples thereof include acrylic acid, methacrylic acid, maleic acid, maleic anhydride, fumaric acid, crotonic acid, itaconic acid and the like.

Although the compound having a carbodiimide group is not particularly limited as long as the compound is, for example, one having at least one or more carbodiimide structures represented by the following formula (4) per one molecule, in points of moist heat resistant adhesiveness and the like, a polycarbodiimide compound having two or more carbodiimide structures in one molecule is especially preferred. In particular, in the case of using a polymer type isocyanate compound having a plurality of carbodiimide groups at the end and in the side chain of the polymer such as a polyester resin, an acrylic resin or the like, the compound can be preferably used because, when a resin layer in the present invention is provided on a polyester film to prepare a multilayer film, not only hardness of the resin layer and oligomer precipitation inhibiting properties but also adhesiveness to various inks, a hard coat agent or the like, moist heat resistant adhesiveness, flexibility and toughness are enhanced.

$$-N=C=N- \quad (4)$$

A known technique can be applied to the production of a carbodiimide compound, and in general, the compound is obtained by allowing a diisocyanate compound to undergo a polycondensation in the presence of a catalyst. As a diisocyanate compound which is a starting material for a polycarbodiimide compound, an aromatic, aliphatic or alicyclic diisocyanate can be used, and specifically, tolylene diisocyanate, xylene diisocyanate, diphenylmethane diisocyanate, hexamethylene diisocyanate, cyclohexane diisocyanate, isophorone diisocyanate, dicyclohexyl diisocyanate, or the like can be used. Furthermore, as long as the effect of the present invention is not lost, in order to enhance the water-solubility or water-dispersibility of a polycarbodiimide compound, the compound may be added with a surfactant or may be added with a hydrophilic monomer such as polyalkylene oxide, quaternary ammonium salt of a dialkylamino alcohol and a hydroxyalkylsulfonic acid salt to be used.

Moreover, other compounds, for example, an aziridine compound, an amidoepoxy compound, a titanate-based coupling agent such as a titanium chelate, a methylolated or alkylolated urea-based compound, an acrylamide-based compound and the like, can be optionally used.

(7) Polyester Film

A polyester film as a substrate film in the multilayer film according to the present invention will be described in detail. Polyester refers to a general term for a polymer in which ester linkages constitute major linkage chains of the main chains, and one in which at least one constituent component selected from ethylene terephthalate, propylene terephthalate, ethylene-2,6-naphthalate, butylene terephthalate, propylene-2,6-naphthalate, ethylene-α,β-bis(2-chlorophenoxy)ethane-4,4'-dicarboxylate and the like constitutes a major constituent component can be preferably used therefor. In the present invention, it is preferred that polyethylene terephthalate be used as the polyester film. Moreover, in the case where heat, shrinkage stress and the like are applied to the polyester film, it is especially preferred that polyethylene-2,6-naphthalate excellent in heat resistance and rigidity be used as the polyester film.

It is preferred that the above-mentioned polyester film be a biaxially oriented one. A biaxially oriented polyester film generally refers to one prepared by allowing a polyester sheet or film in an unstretched state to be stretched by about 2.5 to 5 times in both of the longitudinal direction and the widthwise direction orthogonal to the longitudinal direction, and then, allowing the sheet or film to be subjected to a heat treatment to complete the crystal orientation, and refers to one which exhibits a wide angle X-ray diffraction pattern showing biaxial orientation characteristics. In the case where the polyester film is not biaxially oriented, it is not preferred because the thermal stability, in particular the dimensional stability or the mechanical strength, of the multilayer film is insufficient and the planarity becomes poor.

Moreover, in the polyester film, various additives, for example an oxidation inhibitor, a heat-resistance stabilizer, a weather-resistance stabilizer, an ultraviolet ray absorber, an organic slipperiness imparting agent, a pigment, a dye, organic or inorganic fine particles, a filler, an antistatic agent, a nucleating agent and the like, may be added so much that the film is not deteriorated in its characteristics.

Although the thickness of the polyester film is not particularly limited and is appropriately selected according to the application and the kind, from the viewpoints of mechanical strength and handling properties, the thickness is usually preferably 10 to 500 μm, more preferably 38 to 250 μm, and most preferably 75 to 150 μm. Moreover, the polyester film may be a composite film prepared by coextrusion or may be a film prepared by allowing the films obtained to be bonded together by various methods.

(8) Forming Method of Resin Layer

In the present invention, it is preferred that a resin composition containing a resin (A) and a melamine compound (B) be provided on at least one surface of a polyester film and then heated to 150° C. or higher to form a resin layer containing a resin ($\alpha$) on the polyester film. By setting the heating temperature to 150° C. or higher, it is possible to form a resin layer having the structures of the formulas (1) to (3). Thus, it is possible to obtain a multilayer film which hardly suffers from scratches and hardly allows oligomers to precipitate.

Moreover, in the resin composition, it is preferred that the total of the contents of the resin (A) and the melamine compound (B) be 70% by mass or more relative to the solid content in the resin composition. By allowing the total of the contents of the resin (A) and the melamine compound (B) to be 70% by mass or more, it is possible to efficiently form a resin layer having the structures of the formulas (1) to (3) at the time of heating the resin composition to 150° C. or higher. On the other hand, with regard to a compound (C) and other various additives other than the resin (A) and the melamine compound (B), it is preferred that the total of the contents thereof be less than 30% by mass relative to the solid content in the resin composition. By allowing the total of the contents of the compound (C) and other various additives to be less than 30% by mass, the formation of a resin layer having the structures of the formulas (1) to (3) obtained from the resin (A) and the melamine compound (B) described above is not hindered, and moreover, it is possible to enhance the characteristics such as adhesiveness of the resin layer to various inks, a hard coat agent or the like, moist heat resistant adhesiveness, flexibility and toughness.

At the time of providing a resin composition containing a resin (A) and a melamine compound (B) on a polyester film, a solvent may be used. That is, the resin (A) and the melamine compound (B) may be dissolved or dispersed in a solvent to prepare a coating liquid, and this may be applied on a polyester film. After the liquid is applied, by allowing the solvent to dry and heating to 150° C. or higher, a film on which a resin ($\alpha$) is laminated can be obtained. In the present invention, it is preferred that an aqueous solvent (E) be used as the solvent. By using an aqueous solvent, it is possible to prevent a solvent from rapidly vaporizing in heating process and to form a uniform resin layer. Moreover, the aqueous solvent is superior to the organic solvent in point of the environmental load.

In this context, an aqueous solvent (E) refers to water or a mixture prepared by allowing water and an organic solvent soluble in water including alcohols such as methanol, ethanol, isopropyl alcohol and butanol; ketones such as acetone and methyl ethyl ketone; glycols such as ethylene glycol, diethylene glycol and propylene glycol, and the like to be mixed at an arbitrary ratio.

As a method of applying a resin composition on a polyester film, although either of an in-line coating method or of an off coating method is acceptable, preferred is an in-line coating method. An in-line coating method is a method in which coating is performed within a process for the production of a polyester film. Specifically, the method refers to a method in which coating is performed at any stage from the time when a polyester resin is melt-extruded until a film is subjected to a heat treatment and wound up after being biaxially stretched. Usually, the resin composition is applied on any film of an unstretched (unoriented) polyester film (hereinafter sometimes referred to as an A film) which is obtained by being melt-extruded and then rapidly cooled and is substantially in an amorphous state, a uniaxially stretched (uniaxially oriented) polyester film (hereinafter sometimes referred to as a B film) which is stretched in the longitudinal direction thereafter, or a biaxially stretched (biaxially oriented) polyester film (hereinafter sometimes referred to as a C film) before a heat treatment which is further stretched in the widthwise direction.

In the present invention, it is preferred that a method of applying a resin composition on any film of the A film and B film which are polyester films before the crystal orientation is completed, allowing the solvent to be evaporated, allowing the polyester film to be stretched in the uniaxial direction or biaxial directions and to be heated at 150° C. or higher, and then allowing the crystal orientation of the polyester film to be completed to provide a resin layer be employed. Since film-forming of a polyester film, and coating with a resin composition, drying the solvent and heating (that is, formation of a resin layer) can be simultaneously performed according to this method, the method has the advantage relating to production costs. Moreover, since stretching is performed after coating, it is easy to make the thickness of a resin layer thinner.

Of these, a method of applying a resin composition on a film uniaxially stretched in the longitudinal direction (a B film), allowing the solvent to dry, and then allowing the film to be stretched in the widthwise direction and to be heated to 150° C. or higher is preferred. Since the method has the number of stretching processes smaller by one than that in a method of applying a resin composition on an unstretched film and then biaxially stretching the film, it is possible to suppress the occurrence of defects and cracks in a resin layer caused by stretching.

On the other hand, an off-line coating method is a method of applying a resin composition on a film obtained after allowing the above-mentioned A film to be uniaxially or biaxially stretched and subjecting the film to a heating treatment to complete the crystal orientation of the polyester film, or on an A film, in a process separate from a film-forming process for the film. In the present invention, it is preferred that the resin composition be provided by an in-line coating method because of various advantages previously described.

Accordingly, in the present invention, the best method of forming a resin layer is a method of applying a resin composition prepared with an aqueous solvent (E) on a polyester film by means of an in-line coating method, allowing the aqueous solvent (E) to dry, and allowing the film to be heated at 150° C. or higher to form a resin layer.

(8) Preparation Method of Coating Liquid Containing Resin Composition

In the case of preparing a coating liquid containing a resin composition, it is preferred that an aqueous solvent (E) be used as the solvent. The coating liquid containing a resin composition can be prepared by allowing a resin (A) which is water-dispersed or water-solubilized as necessary, a melamine compound (B) and an aqueous solvent (E) to be mixed at a desired weight ratio in any order and stirred. Then, various additives such as a slipperiness imparting agent, inorganic particles, organic particles, a surfactant, an oxidation inhibitor and a thermal initiator can be mixed and stirred as necessary in any order so much that the resin layer formed by the resin composition is not deteriorated in its characteristics. As a method of mixing and stirring, a container can be shaken by hand, a magnetic stirrer and a stirring paddle can be used, and the ultrasonic irradiation, dispersing by vibrations and the like can be performed.

(9) Coating Method

As a method of applying a resin composition on a polyester film, a known coating method, for example any method such as a bar coating method, a reverse coating method, a gravure coating method, a die coating method and a blade coating method, can be used.

(10) Multilayer Film Production Method

The method for producing a multilayer film according to the present invention will be described with reference to an example in which a polyethylene terephthalate (hereinafter, referred to as PET) film is used as the polyester film. First, pellets of PET are thoroughly dried under vacuum, after which the pellets are fed into an extruder and melt-extruded into a sheet-like shape at about 280° C., and the sheet is cooled and solidified to prepare an unstretched (unoriented) PET film (A film). The A film is stretched by 2.5 to 5.0 times in the longitudinal direction with a roll heated to 80 to 120° C. to obtain a uniaxially oriented PET film (B film). On one surface of this B film, a coating liquid composed of a resin composition containing a resin (A) and a melamine compound (B) in which the concentration is adjusted to a prescribed concentration is applied. In this case, before coating, the surface to be coated of a PET film may be subjected to a surface treatment such as a corona discharge treatment. By performing a surface treatment such as a corona discharge treatment, it is possible to prevent cissing formed by a resin composition and to achieve a uniform coating thickness since the coating properties of the resin composition on a PET film are enhanced.

After coating, the PET film is grasped with clips at the end parts thereof and introduced into a preheating zone at 80 to 130° C. to allow the solvent of the coating liquid to dry. After drying, the film is stretched by 1.1 to 5.0 times in the widthwise direction. Subsequently, the film is introduced into a heat treatment zone at 150 to 250° C. and subjected to a heat treatment for 1 to 30 seconds, and the formation of a resin layer containing a resin ($\alpha$) is completed as well as the crystal orientation is completed. In this heating process (heat treatment process), the film may be subjected to a 3 to 15% relaxation treatment in the widthwise direction or the longitudinal direction as necessary. The multilayer film thus obtained is satisfactory in transparency, prevents the occurrence of scratches in the transporting process and the processing process, and inhibits the precipitation of oligomers from a polyester film in the processing process accompanied with a heating treatment.

(Method of Measuring Characteristics and Method of Evaluating Effects)

The method of measuring characteristics and the method of evaluating effects in the present invention are as follows.

(1) Measurement of Total Luminous Transmittance and Haze

Three sheets (Three pieces) of multilayer film samples with a square shape having a side of 5 cm are prepared. Next, the sample is allowed to stand for 40 hours at 23° C. and a relative humidity of 50%. With regard to each sample, using a turbidity meter "NDH 5000" available from NIPPON DENSHOKU INDUSTRIES CO., LTD., the measurement of the total luminous transmittance is performed by a method in accordance with JIS "Determination of the total luminous transmittance of plastic transparent materials" (K7361-1, the 1997 edition), and the measurement of the haze is performed by a method in accordance with JIS "Determination of haze for transparent materials" (K7136, the 2000 edition). With regard to each of the total luminous transmittance and the haze, values obtained from the three sheets (three pieces) are averaged to determine the total luminous transmittance value and the haze value of a multilayer film.

(2) Measurement of Resin Layer Thickness

First, a multilayer film is dyed with $RuO_4$. Next, the multilayer film is frozen and then sliced in the film thickness direction to obtain ten strips (ten pieces) of ultrathinly sliced samples for resin layer cross-section observation. The cross section of each sample is observed with a TEM (transmission electron microscope: H7100FA type, available from Hitachi, Ltd.) at ten thousand to one million magnifications to obtain a photograph of the cross section. Measured values of the resin layer thickness obtained from the ten strips (ten pieces) of samples are averaged to determine the resin layer thickness value of a multilayer film.

(3) Pencil Hardness Measurement for Resin Layer

Using "HEIDON-14DR" (available from Shinto Scientific Co., Ltd.), each of pencils with different hardnesses is arranged so that the point of the pencil is brought into contact with the surface of the resin layer side of a multilayer film. Next, in accordance with JIS "Scratch hardness (Pencil method)" (K5600-5-4, the 2008 edition), the pencil is moved under conditions of a load of 750 g, a speed of 30 mm/minute, and a movement distance of 10 mm. Until a scar of 3 mm or more in length is generated on the surface of the resin layer side of a multilayer film, experimental trials for measurement are performed while the hardness of the pencil is sequentially increased. The hardness of a pencil used in a trial immediately prior to the trial where the scar is generated on the surface of the resin layer side of a multilayer film is defined as the pencil hardness of the resin layer. In the case where the resin layer has a pencil hardness of "F" or higher, the multilayer film is evaluated as a film being satisfactory.

(4) Scratch Test (Transporting Roll Scratch Model Evaluation)

A multilayer film is fixed to a plane surface so that the resin layer surface of the multilayer film faces upward. Next, with a stainless steel-made metal rod (SUS304, 10 cm in length, 1 cm in diameter) which is not rotated and is moved at a speed of 10 cm/s, the resin layer surface is rubbed along a straight line over a distance of 10 cm while a constant load of 100 g is applied on the resin layer surface through the rod. A portion subjected to rubbing is observed with an optical microscope at 100 to 500 magnifications, the number of scratches generated on the resin layer surface is counted, and the multilayer film is evaluated according to the following criteria. In the case where there are not more than 5 scratches of 20 μm or more in short-side width, the case is defined as "A" in which the multilayer film is evaluated as a film being satisfactory.

A: There are not more than 5 scratches of 20 μm or more in short-side width on the resin layer surface.

B: There are 6 to 10 scratches of 20 μm or more in short-side width on the resin layer surface.

C: There are not less than 11 scratches of 20 μm or more in short-side width on the resin layer surface.

(5) Heating Treatment Evaluation

A multilayer film sample with a side of 10 cm is fixed to a metal frame at the four sides. Next, the multilayer film sample fixed to the metal frame is arranged in a hot air oven, "HIGH-TEMP-OVEN PHH-200" available from ESPEC Corp., which is set to 150° C. (air quantity gauge "7") so that the sample is allowed to stand vertically on the floor in the oven, and is heated for 1 hour. Afterward, the multilayer film sample was air-cooled and allowed to stand for 1 hour.

Next, in the case where a resin layer is formed only on one surface of a polyester film, by the following method, oligomers that precipitate from the polyester film surface which is a surface opposite to the resin layer are removed. That is, the surface of the polyester film which is located at the opposite side of the resin layer is wiped with nonwoven fabric (HAIZE GAUZE NT-4 available from OZU CORPORATION) wetted with acetone, the surface is further flushed with acetone, and the surface is allowed to stand for 40 hours at 23° C. and a relative humidity of 50% to be dried. Afterward, the haze is measured in the same manner as that in (1), and the difference between this haze and the haze obtained before the heating treatment evaluation is defined as Δ haze to be evaluated.

In the case where resin layers are formed on both surfaces of a polyester film, with regard to the sample which has been air-cooled and allowed to stand for 1 hour as described above, the haze is measured in the same manner as that in (1), and the value obtained by dividing the difference between this haze and the haze obtained before the heating treatment evaluation by 2 (=((the haze value obtained after the heating treatment evaluation)−(the haze value obtained before the heating treatment evaluation))/2) is defined as Δ haze to be evaluated. The Δ haze of less than 0.3% is satisfactory.

In this connection, in both of the case where a resin layer is formed only on one surface of a polyester film and the case where resin layers are formed on both surfaces of a polyester film, the Δ haze of less than 0.3% is satisfactory. In this connection, as a rough indication, when the Δ haze is less than 0.3%, the change in haze value between before and after the heating treatment cannot be visually determined. When the Δ haze is not less than 0.3% and less than 0.5%, although it depends on an individual, there is a possibility that the change in haze value between before and after the heating treatment can be visually determined. When the Δ haze is not less than 0.5%, the change in haze between before and after the heating treatment can be visually determined distinctly.

(6) Confirmation of Structures of Formulas (1) to (3) in Resin Forming Resin Layer Although a method for confirming the structures of the formulas (1) to (3) in the resin forming the resin layer is not particularly limited to a specific method, the method can be exemplified by the following method. For example, the presence or absence of weight peaks derived from the structures of the formulas (1) to (3) is confirmed by gas chromatography-mass spectrometry (GC-MS). Next, the presence or absence of a peak derived from a bond between each two atoms which the structures of the formulas (1) to (3) have is confirmed by Fourier transform infrared spectroscopy (FT-IR). Furthermore, the positions of chemical shifts derived from the positions of hydrogen atoms and the proton-absorption line area derived from the number of hydrogen atoms which the structures of the formulas (1) to (3) have are confirmed by proton-nuclear magnetic resonance spectroscopy (1H-NMR). A method of summarizing these results and comprehensively confirming the structures is preferred.

(7) Measurement of Glass Transition Temperature (Tg) of Resin ($\alpha$)

First, a 5-mg portion of a multilayer film is weighed. Next, the measurement for the multilayer film weighed is performed with a temperature modulated differential scanning calorimeter (TMDSC) Q1000 (available from TA Instruments Japan Inc.). With the temperature modulated differential scanning calorimeter, the all DSC signals (the whole heat flow) can be divided into a reversible heat component attributed to the exothermic and endothermic phenomena such as the glass transition and an irreversible heat component attributed to the enthalpy relaxation, the hardening reaction, desolventizing or the like. From the all differential scanning calorie signals obtained in the measurement, a signal derived from the glass transition point of a resin ($\alpha$) as a reversible component is extracted to be defined as the glass transition point of the resin ($\alpha$). In this context, by measuring a glass transition point of a polyester forming a polyester film which is a substrate film of the multilayer film in advance, it is possible to distinguish between glass transition points of the polyester forming a polyester film and the resin ($\alpha$).

EXAMPLES

Example 1

Resin (A) having Hydroxyl Group and Acryloyl Group:

Into a stainless steel-made reaction vessel, methyl methacrylate (a), hydroxyethyl methacrylate (b), and a urethane acrylate oligomer (available from Negami Chemical Industrial Co., Ltd., Art Resin (registered trademark) UN-3320HA, the number of acryloyl groups is 6) (c) were placed at the mass ratio shown in the table, and 2 parts by mass of sodium dodecylbenzenesulfonate as an emulsifying agent was added to 100 parts by mass of the total of the (a) to (c) and stirred to prepare a liquid mixture 1. Next, a reaction apparatus equipped with a stirrer, a reflux condenser, a thermometer and a dropping funnel was prepared. Into the reaction apparatus, 60 parts by weight of the liquid mixture 1, 200 parts by weight of isopropyl alcohol, and 5 parts by weight of potassium persulfate as a polymerization initiator were placed and heated to 60° C. to prepare a liquid mixture 2. The liquid mixture 2 was allowed to remain in a state of being heated at 60° C. for 20 minutes. Next, a liquid mixture 3 composed of 40 parts by weight of the liquid mixture 1, 50 parts by weight of isopropyl alcohol, and 5 parts by weight of potassium persulfate was prepared. Subsequently, using the dropping funnel, the liquid mixture 3 was added dropwise to the liquid mixture 2 over a period of 2 hours to prepare a liquid mixture 4. Afterward, the liquid mixture 4 was allowed to remain in a state of being heated at 60° C. for 2 hours. The resultant liquid mixture 4 was cooled to 50° C. or lower, and then, transferred to a vessel equipped with a stirrer and a pressure reducing apparatus. To this, 60 parts by weight of aqueous ammonia with a concentration of 25% by weight, and 900 parts by weight of pure water were added, and isopropyl alcohol and unreacted monomers were recovered under reduced pressure while being heated to 60° C. to obtain a resin (A) dispersed in pure water.

Melamine Compound (B) having Methylol Group:

A methylolated melamine (available from SANWA CHEMICAL CO., LTD., NIKALAC (registered trademark) MX-035) was used.

Resin Composition, and Coating Liquid Containing Resin Composition:

The resin (A) and the melamine compound (B) were mixed so that they had a mass ratio of (A)/(B)=100/50. To this, in order to impart the multilayer film surface with easy slipping properties, 2 parts by mass of silica particles with a number average particle diameter of 300 nm (SEAHOSTAR (registered trademark) KE-W30 available from NIPPON SHOKUBAI CO., LTD.) as inorganic particles was added relative to 100 parts by mass of the resin (A).

Furthermore, in order to enhance the coating properties of the resin composition to the surface of a polyester film, a fluorine-based surfactant (PLAS COAT (registered trademark) RY-2 available from GOO Chemical Co., Ltd.) was added to the resin composition so that the content thereof in a coating liquid containing the resin composition becomes 0.06 part by mass.

Polyester Film:

PET pellets containing substantially no particle (limiting viscosity 0.63 dl/g) were thoroughly dried under vacuum, after which the pellets were fed into an extruder and melted at 285° C. Next, the molten PET material was extruded from a T-die into a sheet-like shape, and the sheet was wound around a mirror finished surface casting drum with a surface temperature of 25° C. by a static electricity applying casting method to be cooled and solidified. This upstretched film was heated to 90° C. and stretched by 3.4 times in the longitudinal direction to prepare a uniaxially stretched film (B film).

Multilayer Film:

On one surface of a uniaxially stretched film, a resin composition was applied so that the coating thickness becomes about 8 μm using a bar coater. Subsequently, the uniaxially stretched film on which the resin composition was applied was grasped with clips at both end parts thereof in the widthwise direction and introduced into a preheating zone. The atmospheric temperature of the preheating zone was set to 90° C. to 100° C., and the solvent of the coating liquid containing the resin composition was allowed to dry. Subsequently, the film was sequentially stretched by 3.5 times in the widthwise direction in a stretching zone at 110° C., and subsequently, the film was subjected to a heat treatment for 20 seconds in a heat treatment zone at 235° C. and a resin (α) was allowed to be formed to obtain a multilayer film in which the crystal orientation of the polyester film was completed. In the resultant multilayer film, the thickness of the PET film and the thickness of the resin layer were determined to be 100 μm and 85 nm, respectively.

With regard to the resin forming the resin layer of the multilayer film, the existence of weight peaks derived from the structures of the formulas (1) to (3) has been confirmed by gas chromatography-mass spectrometry (GC-MS). Next; the existence of a peak derived from a bond between each two atoms which the structures of the formulas (1) to (3) have has been confirmed by Fourier transform infrared spectroscopy (FT-IR). Finally, by proton-nuclear magnetic resonance spectroscopy (1H-NMR), the number of hydrogen atoms has been confirmed from the positions of chemical shifts derived from the positions of hydrogen atoms and the proton-absorption line area which the structures of the formulas (1) to (3) have. By summarizing these results, it has been confirmed that the resin forming the resin layer has the structures of the formulas (1) to (3).

The characteristics of the resultant multilayer film and the like are shown in Table 2. The resin layer had a pencil hardness of F, the film was excellent in transparency such as total luminous transmittance and haze, and the satisfactory results such as the scratch test of "A" and the rate of change in haze after the heating treatment at 150° C. for 1 hour of within 0.3% were attained.

Examples 2 and 3

A multilayer film was obtained in the same manner as that in Example 1 except that the coating thickness of the resin composition by bar coating was increased and the resin layer thickness was changed to a thickness described in Table 2. The characteristics of the resultant multilayer film and the like are shown in Table 2. In Example 2, by allowing the thickness of the resin layer to be increased compared to Example 1, the film maintained the transparency such as total luminous transmittance and haze satisfactory while the resin layer became hard so as to have a pencil hardness of H, and the satisfactory results such as the scratch test of "A" and the rate of change in haze after the heating treatment at 150° C. for 1 hour of within 0.3% were attained. In Example 3, by allowing the thickness of the resin layer to be increased compared to Example 1, the transparency such as total luminous transmittance and haze was slightly lowered although the resin layer became hard so as to have a pencil hardness of H. The satisfactory results such as the scratch test of "A" and the rate of change in haze after the heating treatment at 150° C. for 1 hour of within 0.3% were attained.

Examples 4 and 5

A multilayer film was obtained in the same manner as that in Example 2 except that the mass ratio in the resin (A) was changed to a mass ratio described in Table 1. The characteristics of the resultant multilayer film and the like are shown in Table 2. In Examples 4 and 5 where the composition of the resin (A) having an acrylate structure was changed compared to Example 2, the resin layer had a pencil hardness of F or higher, the film was excellent in transparency such as total luminous transmittance and haze, and the satisfactory results such as the scratch test of "A" and the rate of change in haze after the heating treatment at 150° C. for 1 hour of within 0.3% were attained.

Examples 6 and 7

A multilayer film was obtained in the same manner as that in Example 2 except that the mass ratio between the resin (A) and the melamine compound (B) was changed to a mass ratio described in Table 1. The characteristics of the resultant multilayer film and the like are shown in Table 2. In Examples 6 and 7 where the mass ratio of the melamine compound (B) was changed compared to Example 2, the resin layer had a pencil hardness of F or higher, the film was excellent in transparency such as total luminous transmittance and haze, and the satisfactory results such as the scratch test of "A" and the rate of change in haze after the heating treatment at 150° C. for 1 hour of within 0.3% were attained.

Examples 8 and 9

A multilayer film was obtained in the same manner as that in Example 2 except that the prescribed number of parts by mass of 2-vinyl-2-oxazoline (C) described in Table 1, as a component other than the resin (A) and the melamine compound (B), was added to the resin composition relative to 100 parts by mass of the resin (A). The characteristics of the resultant multilayer film and the like are shown in Table 2. In Examples 8 and 9 where the mass ratio of the resin (A), the melamine compound (B) and the oxazoline-group containing compound (C) in the resin composition was changed compared to Example 2, the resin layer had a pencil hardness of F or higher, the film was excellent in transparency such as total luminous transmittance and haze, and the satisfactory results such as the scratch test of "A" and the rate of change in haze after the heating treatment at 150° C. for 1 hour of within 0.3% were attained.

Examples 10 to 12

A multilayer film was obtained in the same manner as that in Example 2 except that, in the process of producing the multilayer film, the heating temperature in a heat treatment zone after stretching was changed to a temperature described in Table 2. The characteristics of the resultant multilayer film and the like are shown in the table. In Examples 10 to 12 where the heating treatment temperature was changed compared to Example 2, the resin layer had a pencil hardness of F or higher, the film was excellent in transparency such as total luminous transmittance and haze, and the satisfactory results such as the scratch test of "A" and the rate of change in haze after the heating treatment at 150° C. for 1 hour of within 0.3% were attained.

TABLE 1

| | Resin (A) | | | (A)/(B)/(C)/Particles [parts by weight] | (A) + (B) content relative to solid content in resin composition [% by weight] |
|---|---|---|---|---|---|
| | (a) [parts by mass] | (b) | (c) | | |
| Example 1 | 75 | 20 | 5 | 100/50/0/2 | 99 |
| Example 2 | 75 | 20 | 5 | 100/50/0/2 | 99 |
| Example 3 | 75 | 20 | 5 | 100/50/0/2 | 99 |
| Example 4 | 98 | 1 | 1 | 100/50/0/2 | 99 |
| Example 5 | 55 | 30 | 15 | 100/50/0/2 | 99 |
| Example 6 | 75 | 20 | 5 | 100/30/0/2 | 99 |
| Example 7 | 75 | 20 | 5 | 100/100/0/2 | 99 |
| Example 8 | 75 | 20 | 5 | 100/50/60/2 | 71 |
| Example 9 | 75 | 20 | 5 | 100/50/30/2 | 82 |
| Example 10 | 75 | 20 | 5 | 100/50/0/2 | 99 |
| Example 11 | 75 | 20 | 5 | 100/50/0/2 | 99 |
| Example 12 | 75 | 20 | 5 | 100/50/0/2 | 99 |

TABLE 2

| | Multilayer film production conditions/Evaluation results | | | | | | | | |
|---|---|---|---|---|---|---|---|---|---|
| | Temperature of heat treatment zone [° C.] | Resin layer thickness [nm] | Pencil hardness | Transmittance [%] | Haze [%] | Tg of resin (alpha) [° C.] | Scratch test [A, B, C] | Number of scratches | Heating treatment evaluation (delta haze) [%] |
| Example 1 | 235 | 85 | F | 90.80 | 0.62 | 65 | A | 5 | 0.25 |
| Example 2 | 235 | 250 | H | 90.65 | 0.85 | 64 | A | 3 | 0.19 |
| Example 3 | 235 | 490 | H | 90.55 | 2.68 | 64 | A | 1 | 0.09 |
| Example 4 | 235 | 250 | F | 90.68 | 0.78 | 78 | A | 5 | 0.27 |
| Example 5 | 235 | 250 | H | 90.05 | 0.73 | 55 | A | 3 | 0.15 |
| Example 6 | 235 | 250 | F | 90.25 | 0.72 | 50 | A | 4 | 0.20 |
| Example 7 | 235 | 250 | H | 90.00 | 0.85 | 75 | A | 3 | 0.14 |
| Example 8 | 235 | 250 | H | 90.24 | 0.95 | 54 | A | 4 | 0.23 |
| Example 9 | 235 | 250 | H | 90.84 | 0.86 | 50 | A | 4 | 0.24 |
| Example 10 | 150 | 250 | F | 89.69 | 1.00 | 51 | A | 5 | 0.29 |
| Example 11 | 180 | 250 | H | 90.05 | 0.92 | 60 | A | 4 | 0.24 |
| Example 12 | 210 | 250 | H | 90.62 | 0.85 | 63 | A | 3 | 0.22 |

Example 13

A multilayer film was obtained in the same manner as that in Example 2 except that the compound (c) in the resin (A) was changed to a compound (a compound having a urethane structure and multifunctional acryloyl groups) obtained from 5 parts by mass of a urethane acrylate oligomer (available from Negami Chemical Industrial Co., Ltd., Art Resin (registered trademark) UN-3320HA, the number of acryloyl groups is 6) and 5 parts by mass of N-methylolacrylamide. The characteristics of the resultant multilayer film and the like are shown in Table 4. In Example 13 where the composition of the compound (c) was changed compared to Example 2, the resin layer had a pencil hardness of H, the film was excellent in transparency such as total luminous transmittance and haze, and the satisfactory results such as the scratch test of "A" and the rate of change in haze after the heating treatment at 150° C. for 1 hour of within 0.3% were attained.

Example 14

A multilayer film was obtained in the same manner as that in Example 2 except that the compound (c) in the resin (A) was changed to a urethane acrylate oligomer (available from TOYO CHEMICALS CO., LTD., Miramer (registered trademark) HR3200, the number of acryloyl groups is 4) (a compound having a urethane structure and multifunctional acryloyl groups). The characteristics of the resultant multilayer film and the like are shown in Table 4. In Example 14 where the composition of the compound (c) was changed compared to Example 2, the resin layer had a pencil hardness of F, the film was excellent in transparency such as total luminous transmittance and haze, and the satisfactory results such as the scratch test of "A" and the rate of change in haze after the heating treatment at 150° C. for 1 hour of within 0.3% were attained.

Example 15

A multilayer film was obtained in the same manner as that in Example 2 except that the compound (c) in the resin (A) was changed to a urethane acrylate oligomer (available from Negami Chemical Industrial Co., Ltd., Art Resin (registered trademark) UN-3320HS, the number of acryloyl groups is 15) (a compound having a urethane structure and multifunctional acryloyl groups). The characteristics of the resultant multilayer film and the like are shown in Table 4. In Example 15 where the composition of the compound (c) was changed compared to Example 2, the resin layer had a pencil hardness of H, the film was excellent in transparency such as total luminous transmittance and haze, and the satisfactory results such as the scratch test of "A" and the rate of change in haze after the heating treatment at 150° C. for 1 hour of within 0.3% were attained.

Example 16

A multilayer film was obtained in the same manner as that in Example 15 except that the mass ratio between the resin (A) and the melamine compound (B) was changed to a mass ratio described in the table. The characteristics of the resultant multilayer film and the like are shown in Table 4. In Example 16 where the mass ratio of the melamine compound (B) was changed compared to Example 15, the resin layer had a pencil hardness of H, the film was excellent in transparency such as total luminous transmittance and haze, and the satisfactory results such as the scratch test of "A" and the rate of change in haze after the heating treatment at 150° C. for 1 hour of within 0.3% were attained.

Example 17

A multilayer film was obtained in the same manner as that in Example 2 except that the acrylic acid ester compound and/or the methacrylic acid ester compound (a) in the resin (A) was changed to methyl acrylate. The characteristics of the resultant multilayer film and the like are shown in Table 4. In Example 17 where the acrylic acid ester compound and/or the methacrylic acid ester compound (a) was changed compared to Example 2, the resin layer had a pencil hardness of H, the film was excellent in transparency such as total luminous transmittance and haze, and the satisfactory results such as the scratch test of "A" and the rate of change in haze after the heating treatment at 150° C. for 1 hour of within 0.3% were attained.

Example 18

A multilayer film was obtained in the same manner as that in Example 2 except that the ethylene-based unsaturated compound (b) having a hydroxyl group in the resin (A) was changed to 2-hydroxyethyl acrylate. The characteristics of the resultant multilayer film and the like are shown in Table 4. In Example 18 where the ethylene-based unsaturated compound (b) having a hydroxyl group was changed compared to Example 2, the resin layer had a pencil hardness of H, the film was excellent in transparency such as total luminous transmittance and haze, and the satisfactory results such as the scratch test of "A" and the rate of change in haze after the heating treatment at 150° C. for 1 hour of within 0.3% were attained.

Example 19

A multilayer film was obtained in the same manner as that in Example 2 except that the prescribed number of parts by mass of an oxazoline compound (C) ("EPOCROS" (registered trademark) WS-500 available from NIPPON SHOKUBAI CO., LTD.) described in Table 3, as a component other than the resin (A) and the melamine compound (B), was added to the resin composition relative to 100 parts by mass of the resin (A). The characteristics of the resultant multilayer film and the like are shown in Table 4. In Example 19 where the content ratio of the resin (A) and the melamine compound (B) in the resin composition was changed compared to Example 2, the resin layer had a pencil hardness of F, the film was excellent in transparency such as total luminous transmittance and haze, and the satisfactory results such as the scratch test of "A" and the rate of change in haze after the heating treatment at 150° C. for 1 hour of within 0.3% were attained.

Example 20

A multilayer film was obtained in the same manner as that in Example 2 except that the mass ratio in the resin (A) was changed to a mass ratio described in the table. The characteristics of the resultant multilayer film and the like are shown in Table 4. With regard to the resin forming the resin layer of the multilayer film, as a result of analyzing the resin by GC-MS, FT-IR and 1H-NMR, although it was confirmed that the resin had structures of the formulas (1) and (2), the structure of the formula (3) was not confirmed. In Example 20 where the resin forming the resin layer did not have a chemical structure expressed by the formula (3), although the haze value was raised compared to Example 2 since cracks had been generated in the resin layer, the satisfactory results such as the scratch test of "A" and the rate of change in haze after the heating treatment at 150° C. for 1 hour of within 0.3% were attained.

Example 21

A multilayer film was obtained in the same manner as that in Example 2 except that the resin composition was applied on both surfaces of the uniaxially stretched film to provide resin layers on both surfaces of the polyester film. The thickness of each of resin layers which the multilayer film had on its both surfaces was determined to be 250 nm. The characteristics of the resultant multilayer film and the like are shown in Table 4. In Example 21, both resin layers which the multilayer film had on its both surfaces had a pencil hardness of H, and the results of the scratch tests were "A". Moreover, the multilayer film maintained the transparency such as total luminous transmittance and haze satisfactory, and the satisfactory result similar to that in Example 2 such as the rate of change in haze after the heating treatment at 150° C. for 1 hour of within 0.3% was attained.

TABLE 3

| | Resin (A) | | | Resin composition | |
|---|---|---|---|---|---|
| | (a) | (b) | (c) | (A)/(B)/(C)/Particles | (A) + (B) content relative to solid content in resin composition |
| | [parts by mass] | | | [parts by weight] | [% by weight] |
| Example 13 | 70 | 20 | 10 | 100/50/0/2 | 99 |
| Example 14 | 75 | 20 | 5 | 100/50/0/2 | 99 |
| Example 15 | 75 | 20 | 5 | 100/50/0/2 | 99 |
| Example 16 | 75 | 20 | 5 | 100/100/0/2 | 99 |
| Example 17 | 75 | 20 | 5 | 100/50/0/2 | 99 |
| Example 18 | 75 | 20 | 5 | 100/50/0/2 | 99 |
| Example 19 | 75 | 20 | 5 | 100/50/55/2 | 72 |
| Example 20 | 80 | 20 | 0 | 100/50/0/2 | 99 |
| Example 21 | 75 | 20 | 5 | 100/50/0/2 | 99 |

TABLE 4

Multilayer film production conditions/Evaluation results

| | Temperature of heat treatment zone [° C.] | Resin layer thickness [nm] | Pencil hardness | Transmittance [%] | Haze [%] | Tg of resin (alpha) [° C.] | Scratch test [A, B, C] | Number of scratches | Heating treatment evaluation (delta haze) [%] |
|---|---|---|---|---|---|---|---|---|---|
| Example 13 | 235 | 250 | H | 90.00 | 0.69 | 75 | A | 2 | 0.08 |
| Example 14 | 235 | 250 | F | 90.35 | 0.75 | 60 | A | 4 | 0.25 |
| Example 15 | 235 | 250 | H | 90.69 | 0.90 | 80 | A | 1 | 0.07 |
| Example 16 | 235 | 250 | H | 90.55 | 0.86 | 78 | A | 2 | 0.08 |
| Example 17 | 235 | 250 | H | 90.60 | 0.88 | 40 | A | 3 | 0.18 |
| Example 18 | 235 | 250 | H | 90.43 | 0.79 | 47 | A | 3 | 0.20 |
| Example 19 | 235 | 250 | F | 90.48 | 0.81 | 62 | A | 4 | 0.28 |
| Example 20 | 235 | 250 | F | 89.26 | 2.95 | 65 | A | 5 | 0.29 |
| Example 21 | 235 | 250 | H | 92.23 | 1.05 | 64 | A | 3 | 0.20 |

Comparative Example 1

A multilayer film was obtained in the same manner as that in Example 1 except that the resin layer thickness was changed to a thickness described in Table 6. The characteristics of the resultant multilayer film and the like are shown in Table 6. The thickness of the resin layer was decreased compared to Example 1, whereupon the pencil hardness was lowered to HB, and the both results of the scratch test and the rate of change in haze after the heating treatment at 150° C. for 1 hour were unsatisfactory.

Comparative Example 2

A multilayer film was obtained in the same manner as that in Example 1 except that the resin layer thickness was changed to a thickness described in Table 6. The characteristics of the resultant multilayer film and the like are shown in Table 6. The thickness of the resin layer was increased compared to Example 1, whereupon the haze value became 3.0% or more and the transparency was remarkably lowered.

Comparative Examples 3 to 5

A multilayer film was obtained in the same manner as that in Example 2 except that the mass ratio in the resin (A) was changed to a mass ratio described in Table 5. The characteristics of the resultant multilayer film and the like are shown in Table 6. In each of Comparative Examples 3 to 5 where the composition of the resin (A) having an acrylate structure was changed compared to Example 2, the pencil hardness was lowered to HB or lower, and the both results of the scratch test and the rate of change in haze after the heating treatment at 150° C. for 1 hour were unsatisfactory.

Comparative Example 6

A multilayer film was obtained in the same manner as that in Example 2 except that the mass ratio in the resin (A) was changed to a mass ratio described in Table 5. In Comparative Example 6 where there was no ethylene-based unsaturated compound (b) having a hydroxyl group in the resin (A), since the resin composition failed to be dispersed in an aqueous solvent, one which was separately prepared by allowing the resin composition to be forcibly dispersed with an anionic surfactant was used. The characteristics of the resultant multilayer film and the like are shown in Table 6. In Comparative Example 6, the pencil hardness was lowered to HB, and the both results of the scratch test and the rate of change in haze after the heating treatment at 150° C. for 1 hour were unsatisfactory. With regard to the resin forming the resin layer of the multilayer film, as a result of analyzing the resin by GC-MS, FT-IR and 1H-NMR, although it was confirmed that the resin had structures of the formulas (2) and (3), the structure of the formula (1) was not confirmed.

Comparative Example 7

A multilayer film was obtained in the same manner as that in Example 2 except that the prescribed number of parts by mass of an oxazoline compound (C) ("EPOCROS" (registered trademark) WS-500 available from NIPPON SHOKUBAI CO., LTD.) described in Table 5, as a component other than the resin (A) and the melamine compound (B), was added to the resin composition relative to 100 parts by mass of the resin (A). The characteristics of the resultant multilayer film and the like are shown in Table 6. Since the content ratio of the resin (A) and the melamine compound (B) in the resin composition was further lowered compared to Example 2 and Example 19, the pencil hardness was lowered to HB, and the both results of the scratch test and the rate of change in haze after the heating treatment at 150° C. for 1 hour were unsatisfactory.

Comparative Example 8

A multilayer film was obtained in the same manner as that in Example 2 except that the mass ratio in the resin (A) was changed to a mass ratio described in the table. The characteristics of the resultant multilayer film and the like are shown in Table 6. In Comparative Example 8 where the mass ratio between the resin (A) and the melamine compound (B) in the resin layer was changed compared to Example 1, the pencil hardness was lowered to HB, and the both results of the scratch test and the rate of change in haze after the heating treatment at 150° C. for 1 hour were unsatisfactory.

Comparative Example 9

A multilayer film was obtained in the same manner as that in Example 2 except that, in the process of producing the multilayer film, the heating temperature in a heat treatment zone after stretching was changed to 140° C. That is, the multilayer film was not heated to 150° C. or higher in any zone after coating with the resin composition. The characteristics of the resultant multilayer film and the like are shown in Table 6. Since the heating temperature in a heat treatment zone was changed to 140° C. in Comparative Example 9, a resin (α) was not formed, the pencil hardness was lowered to B, and the both results of the scratch test and the rate of change in haze after the heating treatment at 150° C. for 1 hour were unsatisfactory.

TABLE 5

| | Resin (A) | | | | Resin composition | |
|---|---|---|---|---|---|---|
| | (a) [pats by mass] | (b) | (c) | (A)/(B)/(C)/Particles [parts by weight] | composition [% by weight] | (A) + (B) content relative to solid content in resin |
| Comparative Example 1 | 75 | 20 | 5 | 100/50/0/2 | 99 | |
| Comparative Example 2 | 75 | 20 | 5 | 100/50/0/2 | 99 | |
| Comparative Example 3 | 99 | 1 | 0 | 100/50/0/2 | 99 | |
| Comparative Example 4 | 52 | 30 | 18 | 100/50/0/2 | 99 | |
| Comparative Example 5 | 62 | 33 | 5 | 100/50/0/2 | 99 | |
| Comparative Example 6 | 95 | 0 | 5 | 100/50/0/2 | 99 | |
| Comparative Example 7 | 75 | 20 | 5 | 100/50/70/2 | 68 | |
| Comparative Example 8 | 75 | 20 | 5 | 100/25/0/2 | 98 | |
| Comparative Example 9 | 75 | 20 | 5 | 100/50/0/2 | 99 | |

TABLE 6

| | Multilayer film production conditions/Evaluation results | | | | | | | |
|---|---|---|---|---|---|---|---|---|
| | Temperature of heat treatment zone [° C.] | Resin layer thickness [nm] | Pencil hardness | Transmittance [%] | Haze [%] | Tg of resin (alpha) [° C.] | Scratch test [A, B, C] | Heating treatment evaluation |
| | | | | | | | | Number of scratches | (delta haze) [%] |
| Comparative Example 1 | 235 | 75 | HB | 90.81 | 0.64 | 65 | B | 6 | 0.45 |
| Comparative Example 2 | 235 | 510 | H | 90.46 | 3.23 | 65 | A | 2 | 0.18 |
| Comparative Example 3 | 235 | 250 | B | 90.52 | 1.56 | 76 | C | 18 | 0.94 |
| Comparative Example 4 | 235 | 250 | HB | 90.34 | 3.21 | 48 | B | 7 | 0.67 |
| Comparative Example 5 | 235 | 250 | B | 90.67 | 0.61 | 58 | C | 12 | 0.25 |
| Comparative Example 6 | 235 | 250 | B | 86.53 | 4.53 | 79 | C | 15 | 2.51 |
| Comparative Example 7 | 235 | 250 | HB | 90.10 | 0.88 | 48 | B | 7 | 0.35 |
| Comparative Example 8 | 235 | 250 | HB | 90.23 | 3.15 | 49 | C | 12 | 0.64 |
| Comparative Example 9 | 140 | 250 | B | 90.03 | 0.94 | 49 | C | 11 | 0.45 |

INDUSTRIAL APPLICABILITY

The present invention relates to a multilayer film having an excellent resin layer capable of suppressing scratches on the film surface generated during the film-forming or transporting process of a polyester film and inhibiting oligomers from precipitating from a polyester film in the processing process accompanied with a heating treatment, and the present invention is applicable to a film for optics for use in a display and a touch panel and a film requiring various kinds of heating processing.

The invention claimed is:

1. A multilayer film comprising a resin layer which is prepared with a resin (α) and provided on at least one surface of a polyester film, and satisfying the following conditions (I) to (IV):

(I) the resin layer has a thickness of 80 to 500 nm;

(II) the resin layer has a pencil hardness of "F" or higher;

(III) the multilayer film has a haze value of 3.0% or less; and (IV) the resin (α) is a resin obtained by heating a resin composition containing a resin (A) having a hydroxyl group and an acryloyl group and a melamine compound (B) having a methylol group to 150° C. or higher.

2. The multilayer film according to claim 1, wherein the resin (α) is a resin with a glass transition temperature of 50° C. or higher.

3. The multilayer film according to claim 1, wherein a resin (α) forming the resin layer has a chemical structure expressed by Formula (1):

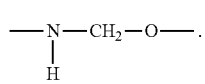

Formula (1)

4. The multilayer film according to claim 1, wherein a resin (α) forming the resin layer has a chemical structure expressed by Formula (2):

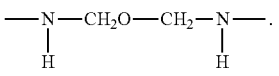

Formula (2)

5. A multilayer film comprising a resin layer which is provided on at least one surface of a polyester film, and satisfying the following conditions (I) to (V):

(I) the resin layer has a thickness of 80 to 500 nm;

(II) the resin layer has a pencil hardness of "F" or higher;

(III) the multilayer film has a haze value of 3.0% or less;

(IV) a resin forming the resin layer has a crosslinked structure of two different acryloyl groups, a chemical structure expressed by formula (1) and a chemical structure expressed by formula (2); and (V) the resin forming the resin layer is a resin with a glass transition temperature of 50° C. or higher;

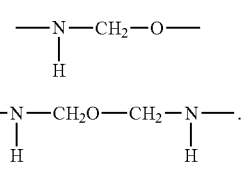

6. The multilayer film according to claim 1, wherein the resin forming the resin layer has a chemical structure expressed by Formula (3):

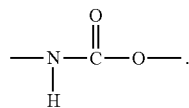

7. A method for producing a multilayer film including a resin layer which is provided on at least one surface of a polyester film and satisfying the following conditions (i) to (iii), comprising the step of applying a resin composition prepared with a resin (A) having a hydroxyl group and an acryloyl group and a melamine compound (B) having a methylol group on at least one surface of the polyester film, heating the resin composition to 150° C. or higher, and allowing the resin layer to be formed:

(i) the resin layer has a thickness of 80 to 500 nm;
(ii) the resin layer has a pencil hardness of "F" or higher; and
(iii) the multilayer film has a haze value of 3.0% or less.

8. The method for producing a multilayer film according to claim 7, wherein the total of the contents of the resin (A) having a hydroxyl group and an acryloyl group and the melamine compound (B) having a methylol group in the resin composition is 70% by mass or more relative to the solid content in the resin composition.

9. The method for producing a multilayer film according to claim 7, wherein the mass ratio (A)/(B) between the contents of the resin (A) and the melamine compound (B) based on parts by mass in the resin composition is 100/30 to 100/100.

10. The method for producing a multilayer film according to claim 7, wherein the resin (A) further has a chemical structure (a urethane structure) expressed by Formula (3):

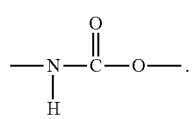

11. The method for producing a multilayer film according to claim 7, wherein the resin (A) is a resin obtained by using at least the following compounds (a) to (c) and allowing them to undergo a polymerization, the mass ratio of each compound used being as follows:

an acrylic acid ester compound and/or a methacrylic acid ester compound (a): 55 to 98 parts by mass;

an ethylene-based unsaturated compound (b) having a hydroxyl group: 1 to 30 parts by mass; and a compound (c) having a chemical structure expressed by Formula (3) and multifunctional acryloyl groups: 1 to 15 parts by mass, wherein the total mass of the (a) to (c) is defined as 100 parts by mass,

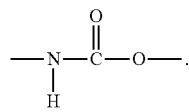

12. The method for producing a multilayer film according to claim 11, wherein the compound (c) further has a methylol group.

13. The method for producing a multilayer film according to claim 7, wherein the resin composition is applied on at least one surface of a polyester film and then the film is at least uniaxially stretched, after which the resin composition is heated to 150° C. or higher to allow a resin layer to be formed.

14. The multilayer film according to claim 2, wherein a resin (α) forming the resin layer has a chemical structure expressed by Formula (1):

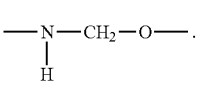

15. The multilayer film according to claim 2, wherein a resin (α) forming the resin layer has a chemical structure expressed by Formula (2):

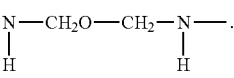

16. The multilayer film according to claim 3, wherein a resin (α) forming the resin layer has a chemical structure expressed by Formula (2):

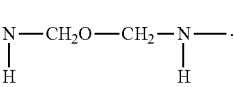

17. The multilayer film according to claim 2, wherein the resin (α) forming the resin layer has a chemical structure expressed by Formula (3):

Formula (3)

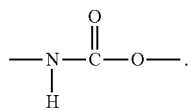

18. The multilayer film according to claim 3, wherein the resin (α) forming the resin layer has a chemical structure expressed by Formula (3):

Formula (3)

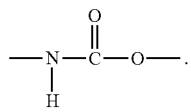

19. The multilayer film according to claim 4, wherein the resin (α) forming the resin layer has a chemical structure expressed by Formula (3):

Formula (3)

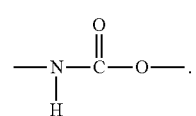

20. The multilayer film according to claim 5, wherein the resin(α) forming the resin layer has a chemical structure expressed by Formula (3):

Formula (3)

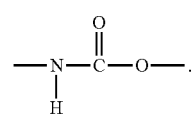

* * * * *